United States Patent
De Graaf

(10) Patent No.: US 11,994,573 B1
(45) Date of Patent: May 28, 2024

(54) MOTION DETECTION USING COMMUNICATION CHANNEL CARRIER SIGNAL

(71) Applicant: Brent De Graaf, Wake Forest, NC (US)

(72) Inventor: Brent De Graaf, Wake Forest, NC (US)

(*) Notice: Subject to any disclaimer, the term of this patent is extended or adjusted under 35 U.S.C. 154(b) by 0 days.

(21) Appl. No.: 18/490,555

(22) Filed: Oct. 19, 2023

(51) Int. Cl.
*G01S 15/62* (2006.01)
*G01S 7/534* (2006.01)
*G01S 11/06* (2006.01)

(52) U.S. Cl.
CPC ................... *G01S 11/06* (2013.01)

(58) Field of Classification Search
None
See application file for complete search history.

(56) References Cited

U.S. PATENT DOCUMENTS

| | | | |
|---|---|---|---|
| 9,182,494 B2 | 11/2015 | Vartanian et al. | |
| 9,524,628 B1 | 12/2016 | Omer et al. | |
| 10,129,853 B2 | 11/2018 | Manku et al. | |
| 10,291,460 B2 | 5/2019 | Zhang et al. | |
| 10,997,329 B2 | 5/2021 | Freeman et al. | |
| 2020/0329343 A1 | 10/2020 | Martinez et al. | |
| 2022/0116272 A1 | 4/2022 | Pazhyannur et al. | |
| 2022/0256429 A1 | 8/2022 | Martinez et al. | |
| 2023/0171564 A1 | 6/2023 | Martinez et al. | |

FOREIGN PATENT DOCUMENTS

WO   WO-2018187339 A1 * 10/2018 ............. G01N 29/07

* cited by examiner

*Primary Examiner* — Gary Lafontant
(74) *Attorney, Agent, or Firm* — Fish & Richardson P.C.

(57) ABSTRACT

Methods, systems, and apparatus, including computer programs encoded on a computer storage medium, for motion detection using a communication channel carrier signal. In one aspect, a method includes, for each of one or more communication channels, wherein each communication channel has a center frequency that is different from the center frequency of each other communication channel: determining mean power levels from consecutive power samples at the center frequency, determining a difference between the mean power levels of two consecutive power samples at the center frequency, and determining whether physical motion is occurring in a monitored area based on the difference between the mean power levels.

22 Claims, 6 Drawing Sheets

MOTION DETECTION USING COMMUNICATION CHANNEL CARRIER SIGNAL

BACKGROUND

This specification relates to motion detection using one or more carrier signals of communication channels.

Motion detectors are used in a variety of applications. Most often a motion detector system includes multiple motion detection devices, such as infrared sensors that detect motion from infrared light disturbances, ultrasonic sensors that detect motion from ultrasonic sound disturbances, and cameras that provide video frames to special purpose software that detects motion from the series of video frames. Such systems are often deployed separately from existing wireless systems, or, in the case of some wireless systems, e.g., Bluetooth®, Wi-Fi®, ZigBee®, require dedicated channels separate from preexisting communication channels used in extant wireless solutions. These requirements complicate deployment of these systems and add expense. Additionally, motion detectors are typically realized by special purpose hardware applications, which drive up the overall system cost.

SUMMARY

This specification describes technologies relating to a motion detection system and method that uses one or more carrier signals of extant communication channels. This allows a motion detection system to be realized using only simple carrier signal generators and corresponding software instructions that can be executed by existing home automation devices, such as wirelessly enabled switches, lights, thermostats, etc. This greatly simplifies system deployment, as only a simple carrier signal generator is required for each automated area to be monitored.

In general, one innovative aspect of the subject matter described in this specification can be embodied in methods that include the actions of, for each of one or more communication channels, wherein each communication channel has a center frequency that is different from the center frequency of each other communication channel: determining mean power levels from consecutive power samples at the center frequency; determining a difference between the mean power levels of two consecutive power samples at the center frequency; and determining whether physical motion is occurring in a monitored area based on the difference between the mean power levels. Other embodiments of this aspect include corresponding systems, apparatus, and computer programs, configured to perform the actions of the methods, encoded on computer storage devices.

In an aspect, the method includes, for each of the one or more communication channels: periodically sampling a power level based on the center frequency at a sampling rate to obtain a plurality of samples; determining, from the plurality of samples, a plurality of mean offset values, wherein each mean offset value is an estimate of a received signal power at the center frequency relative to a reference signal level at the center frequency; and for each mean offset value, determining whether the mean offset value indicates a presence of a valid reference signal; wherein: determining mean power levels from consecutive power samples at the center frequency comprises determining, from sets of power levels, where each set is used in determining a mean offset value that indicates a presence of a valid reference signal, mean power levels from proper subsets of power levels; and determining a difference between the mean power levels of two consecutive power samples at the center frequency comprises determining a difference between the mean power levels of two consecutive proper subsets of the power levels.

In an aspect, determining whether physical motion is occurring in the monitored area based on the difference between the mean power levels comprises determining whether motion is occurring in the area when an absolute value of a difference between the two consecutive sets is greater than a threshold value.

In an aspect, the method includes determining a difference between the maximum power levels of two consecutive proper subsets of the power levels; determining a difference between the minimum power levels of two consecutive proper subsets of power levels; and wherein determining whether physical motion is occurring in the monitored area based on the difference between the mean power levels further comprises determining whether physical motion is occurring based on the difference between the maximum power levels and the difference between the minimum power levels.

In an aspect, determining whether physical motion is occurring based on the difference between the maximum power levels and the difference between the minimum power levels comprises determining that physical motion is occurring in the area when a sum of the absolute value of the difference between the maximum values of the two sets and the absolute value of the difference between the minimum values of the two sets is greater than a first threshold value.

In an aspect, determining whether physical motion is occurring in the monitored area based on the difference between the mean power levels comprises determining whether motion is occurring in the area when an absolute value of a difference between the two consecutive sets is greater than a second threshold value.

In an aspect, periodically sampling the power based on the center frequency comprises periodically sampling a power level of signals within a specific bandwidth range of the center frequency.

In an aspect, the one or more communication channels comprise a plurality of communication channels, and the method further comprises associating each communication channel of the plurality of communication channels with a monitored area, wherein each monitored area for a communication channel is different from each monitored area associated with each other communication channel.

In an aspect, the method further comprises, in each monitored area, generating, within each monitored area, a reference signal at the center frequency of the communication channel associated with the monitored area.

In an aspect, the method further comprises, in each monitored area, monitoring, by a receiver within the monitored area, a reference signal at the center frequency of the communication channel associated with the monitored area for periodically sampling the power level based on the center frequency at the sampling rate.

In an aspect, the center frequencies are 802.11 channel frequencies.

Particular embodiments of the subject matter described in this specification can be implemented so as to realize one or more of the following advantages and/or features. Measuring the change in the overall signal to noise ratio (SNR) or the received signal strength indicator (RSSI) of the communication channel modulated signal does not reliably indicate the presence of human motion. This is because the change in the reading derived from the modulated signal is unpredictable, as it is impacted by information density, the actual bandwidth of the channel, signal paths at the time the disturbance occurs, among other factors. Thus, instead of measuring the modulated signal strength alone, the systems and methods described herein first determine an estimated mean offset value of an unmodulated channel carrier signal. This value, and the constituent measurements used in determining this value, are then used to determine motion detection. In one example, when the mean offset value indicates the presence of carrier signal that can validly sampled to detection motion, data from power samples of the carrier signals are then used to determine whether motion is detected. The calculation of the estimated mean offset is used to take into account the very low frequency modulation, e.g., less than 50 Hz, for example, that occurs to the reference signal in the presence of motion. The estimated mean offset can also be used to determine the presence of a reliable reference signal for monitoring motion. This can be done entirely in software and without a specialized antenna or specialized band pass filter.

The estimated mean offset determination also has the advantage of not impacting the performance of a communication channel when the channel is used to convey information. This is because when the reference signal, which is typically a center frequency of a communication channel, overlaps with a communication signal on the channel, and the reference signal is of equivalent strength to the communication signal or higher, the center frequency power will dominate. Accordingly, the estimated mean offset will show the channel to be a valid reference signal. The communication modulation will not induces errors, as the signals fit within the same spectra without interfering with each other, i.e., the frequency modulation typically does not affect the center frequency.

In implementations in which detection determinations are made by the receiver processors, the required computing resources are minimized based on a sampling protocol. Thus, the receiver functionality can easily be integrated into a smart switch or dimmer without requiring additional hardware resources. Alternatively, power level samples can be provided to a central processing device remote from the receivers and detection determinations can be made by the central processing device.

Reference signal generators can be configured to generate reference signals at center frequencies of information-bearing channels according to a variety of different communication protocols. This allows for inexpensive hardware, along with the requisite software, to be used to implement the system. Receivers that are extant in systems may be adapted to support the motion detection by a simple software update, which simplifies system set up, as the only hardware that is required to be deployed is a signal generator for each monitored area or unit.

The signal generators are low power and may be battery operated to generate a reference signal for weeks or even months on a single battery. The signal generators may also include power converters or couplers, such as solar cells or inductive couplers, allowing for recharging of an energy cell or battery of the signal generator for virtually unlimited operational uptime. The signal generators may be small, such as a 10 mW transmitter of only a few square centimeters in area by ten or fewer millimeters in thickness, which allows for the receiver to be easily tucked inside a wall or ceiling fixture to cover a relatively large area.

In some implementations, a portable version of the detector/receiver can be implemented as a mobile dongle or an app-only version on a smartphone with a portable battery powered reference signal generator for an on-demand detection system, e.g., for motion detection outside hotel room door or human/large animal movement at the perimeter of a campsite.

A signal generator and receiver can also trigger a motion alert if they are moved relative to each other. Thus, in some implementations, a signal generator can be attached to a unit to be monitored, and a receiver can be placed stationary in a room (such as a storage room). When the monitored unit is moved, the system can detect such movement based on the signal disturbance.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Example Operating Environment

Figure 1:
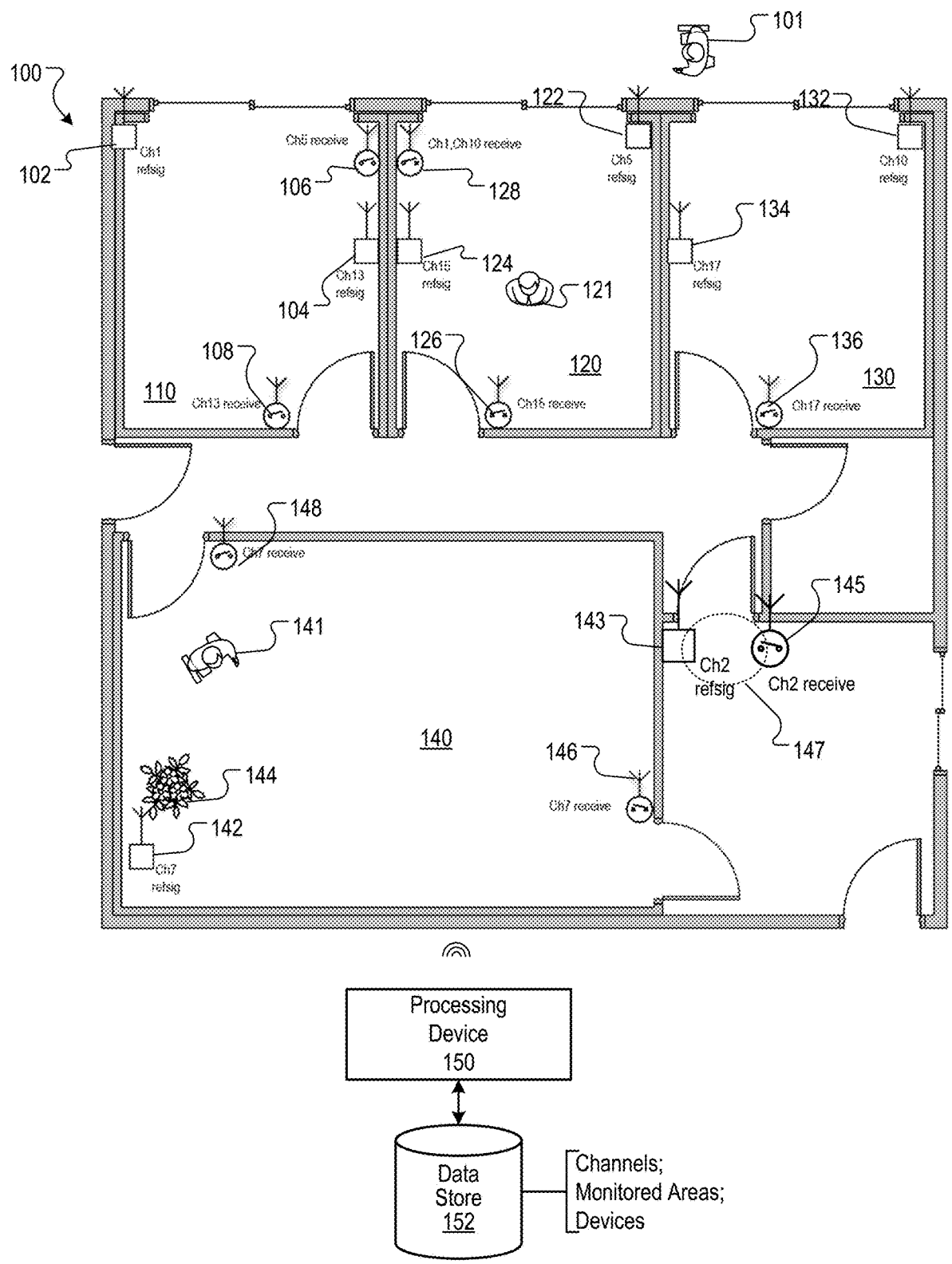
FIG. 1 is a diagram of an example environment in which a system uses communication carrier signals to detect motion.

FIG. 1 is a diagram of an example environment 100 in which a system uses communication carrier signals to detect motion. The carrier signals, in some implementations, are center frequencies of designated communication channels. For example, for a ZigBee® or Wi-Fi® network, the carrier signals would be the center frequencies of the respective channels. Center frequencies for other protocols according to other standards, e.g., 802.11, 802.15, etc., can also be used.

The environment 100 includes four rooms 110, 120, 130 and 140 that are instrumented with a wireless system according to a particular protocol. For example, switches 106 and 108 may provide wireless control of lighting in room 110; switches 126 and 128 may provide wireless control of lighting in room 120; switch 136 may provide wireless control of lighting in room 130; and switches 146 and 148 may provide wireless control of lighting and a fan in room 140. For brevity, switches are provided as example receivers of signals at one or more center frequencies; however, other devices, such as thermostats, light controller, etc., can also be used to perform the function described herein.

In operation, reference signal generators 102, 104, 122, 124, 132, 134 and 142 are placed within rooms 110, 120, 130 and 140. Example reference signal generators are described with reference to FIGS. 2A and 2B.

Switches 106, 108, 126, 128, 136, 146 and 148, while performing their home automation processes, are also configured by the system to act as receivers that perform detection monitoring operations as detection receivers. In some implementations, the receivers, i.e., 106, 108, 126, 128, 136, 146 and 148, receive software updates that configure the receivers to perform the sample and motion detection processes described above and in more detail below. In other implementations, the receivers provide the power level readings of a monitored channel to a central processing device 150 that is remote from the receivers. The central processing device 150 then performs the motion detection analysis described above and in more detail below. Example receivers are described with reference to FIG. 2C below.

Each reference signal generators 102, 104, 122, 124, 132, 134 and 142 is configured to generate a carrier frequency signal of an extant communication channel. In FIG. 1, for example, assume that each channel—channel 1 for signal generator 102, channel 13 for signal generator 104, channel 5 for signal generator 122, channel 15 for signal generator 124, channel 10 for signal generator 132, channel 17 for signal generator 134, and channel 7 for signal generator 142—are each a communication channel defined by a respective center frequency according to a communication standard to which the automation system is implemented. Each center frequency for each communication channel is different from the center frequencies of each other communication channel.

Each receiver can monitor multiple communication channels simultaneously. For example, receiver 128 monitors channels 1 and 10, which correspond to reference signal generators 102 and 122. For brevity, however, each other receiver is configured in this example to monitor only one communication channel for motion detections.

A communication channel utilized for motion detection may also be used by the extant home automation system for other operations, such as lighting control, etc. This is because the carrier signal generated by a signal generator does not adversely impact the demodulation of information conveyed by other components of the extant home automation system. Likewise, the presence of another modulated signal near a carrier frequency does not adversely impact the motion detection processed described in more detail below. Thus, users may select a reference signal for a particular channel for an area to be monitored without blocking that particular channel from other uses in the extant home automation system.

As configured in FIG. 1, signal generators 102, 122, and 132, which generate carrier frequency signals for channels Ch1, Ch5 and Ch10, are positioned near windows of an outside wall. Receivers 106 and 128 are configured to monitor the channels Ch1, Ch5 and Ch10. Because the signal generators are placed near the windows, which are much more permeable to the radio frequency signals than the interior walls, a disturbance in the received carrier frequency power levels along the outer perimeter, such as one caused by an individual 101 walking outside the building, will cause one or more of the receivers 106 and 128 to detect motion. However, the receivers 108, 126 and 136, which are indoors and partially shielded by interior walls, will not detect motion due to signal attenuation.

While the example of perimeter motion detection does not provide localization along the perimeter, in another implementation, signal attenuation measurements of the carrier frequency for Ch1, Ch5 and Ch10 can be compared. For example, because the person 101 is closest to the signal generator 122, the carrier frequency for ch5 may undergo a mean power level change that is greater than the mean power level changes detected for the carrier frequencies of Ch10 and Ch1. Accordingly, a processing system that receives the data from multiple receivers, e.g., the processing device 150, can determine a likely location based on an association of channels, monitored areas, and devices. Such an association is stored in a data store 152. Based on these associations, and the configuration of the system, the association is used to determine in which monitored areas or locations motion detection has and has not occurred. In this example, because the largest disturbance is occurring near the signal generator 122, the system would indicate perimeter motion outside of rooms 120 and 130.

For interior monitoring, each room is associated with a corresponding reference signal generator, and at least one receiver that monitors the carrier frequency of the reference signal generator. For example, the monitored area 140 includes a signal generator 142 transmitting a channel 7 carrier frequency. The devices 146 and 148 are monitoring the carrier frequency at channel 7. Thus, if the detection processing indicates channel 7 has motion detected, e.g., the devices 146 and 148 have detected motion (or, alternatively, the processing device processing the RSSI samples from devices 146 and 148 determines motion has been detected), then the system will indication motion occurring in room 140. Likewise, for room 110, the carrier frequency signal generated by the reference signal generator 104 is monitored by switch 108; for room 120, the carrier frequency signal generated by the reference signal generator 124 is monitored by switch 126; and for room 130, the carrier frequency signal generated by the reference signal generator 134 is monitored by switch 136.

In the room 140, a diffuser 144, e.g., a plastic plant, is placed near the signal generator to scatter the signal generated by the signal generator 142. This aids in coverage of a monitored area by the signal generator and receivers. In other implementations, the signal generators can include, as a diffuser, an antenna covering that provides scattering of the signal from the antenna. A diffuser can be used when the dimensions of the room result in a wave pattern having dead spaces without coverage.

Because the signals are attenuated by the walls, movement in another room will not cause false motion detections in a particular room. For example, the person 121 walking in room 120 will not cause false detections in room 110. This is because the wall medium between the signal generator 104 and the person 121 reduces the signal attenuation in the carrier signal of Ch13 relative to the signal attenuation that would occur were no wall present.

Example Reference Signal Generators and Receivers

Figure 2A:
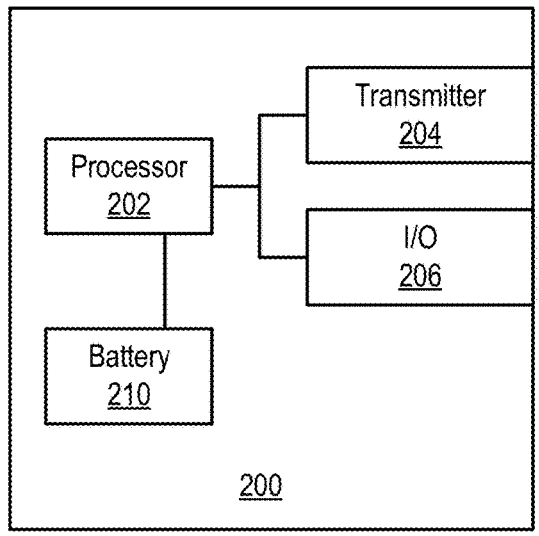
FIG. 2A is an example implementation of a reference signal generator.

FIG. 2A is an example implementation of a reference signal generator 200. The generator 200 includes a processor 202, a transmitter 214, and I/O component 206, and a battery 210. The I/O component may be a wired or wireless I/O device that allows a user to cause the processor 202 to select a center frequency for the transmitter 204. Upon selection, the process 202 causes the transmitter 204 to transmit a reference signal at the center frequency. In some implementations, the reference signal is an unmodulated communications signal, e.g., one of the carrier frequencies of a channel, with a constant power level at an output level of approximately 10 decibel-milliwatts (dBm). This corresponds to approximately ten milliwatts for a 12 m×12 m area with minimal obstructions. Using an unmodulated signal facilitates power tracking as the signal is not shifting frequency due to modulation. Additionally, the presence of another signal in the same area at the same frequency (referred to here as "emitter stacking") neither conflicts nor causes modulation loss. In some implementations, receivers can support multiple frequencies (e.g., 16 channels) of concurrent operation, making complex motion detection possible in every room.

The reference signal generator 200 provides a stable, detectable reference signal. This reference signal's received strength can drift over time in terms of seconds, but otherwise remains relatively stable in the sub-second time frame.

With the reference signal being unmodulated, the data bandwidth component of the reference signal is eliminated. Receiver signal detection is also facilitated due to the properties of the unmodulated reference signal, and the narrow bandwidth, e.g., ideally zero Hz at the carrier frequency, which tend to minimize the interference from neighboring communication channels and from modulated data within the communication channel. Additionally, the unmodulated signal draws considerably lower transmitter power than a modulated signal, allowing the reference signals to cover large areas at lower power levels.

The processor 202 may be configured to select among many center frequencies, such as the center frequencies of Wi-Fi® channels. For example, in the 2.4 GHz band, each center frequency of the 11 channels may be separately selected. Other center frequencies for other standards may also be selected from the 2.4 GHz band. Other frequency bands can also be used.

The battery 210 provides power to the signal generator 200. Given the low power output, the battery 210 may provide enough power to last for months.

Figure 2B:
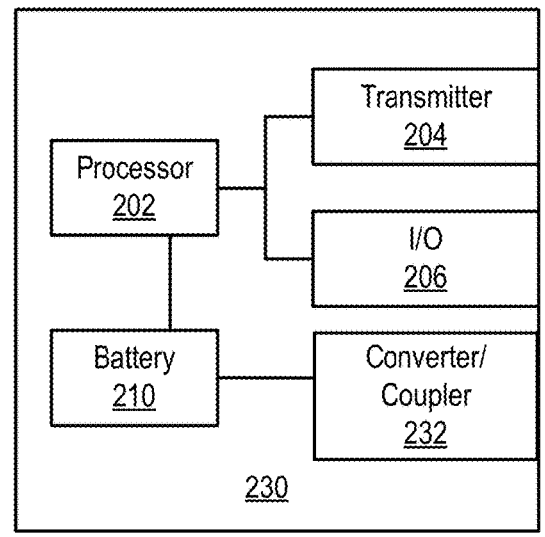
FIG. 2B is another example implementation of a reference signal generator.

The signal generator 230 of FIG. 2B is similar in many respects to the generator 200 of FIG. 2A, except that it also includes a converter/coupler 232 that can provide power to charge the battery 210. The converter coupler can be a passive device, such as an inductive coupler or solar cell, or, alternatively, can be an optional wired power connection.

Figure 2C:
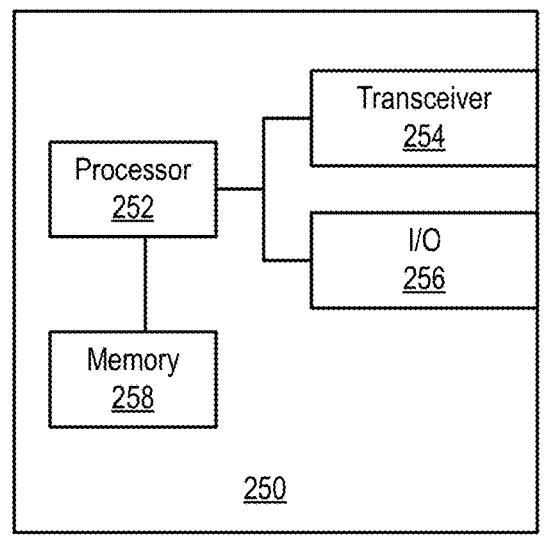
FIG. 2C is an example implementation of a receiver.

FIG. 2C is an example implementation of a receiver 250. The receiver 250 can be, for example, an extant home automation device, such as a wireless light switch, a wireless thermostat, etc. Alternatively, the receiver can be a portable device, such as a dongle that connects to a smart device, e.g., a mobile phone. The receiver 250 includes a processor 252, a transceiver 254, and I/O component 256, and a memory 258. An example processor is the ARM Cortex-M0 chip, but other processors can also be used. The I/O component 256 can be used to provide software updates to the memory 258. Once updated, the software stored in the memory causes the receiver 250 to perform the operations recited below.

In another implementation, the transceiver 254 can also perform as the I/O component 256, and software updates can be received by means of the transceiver.

Example Motion Detection Processes

Figure 3:
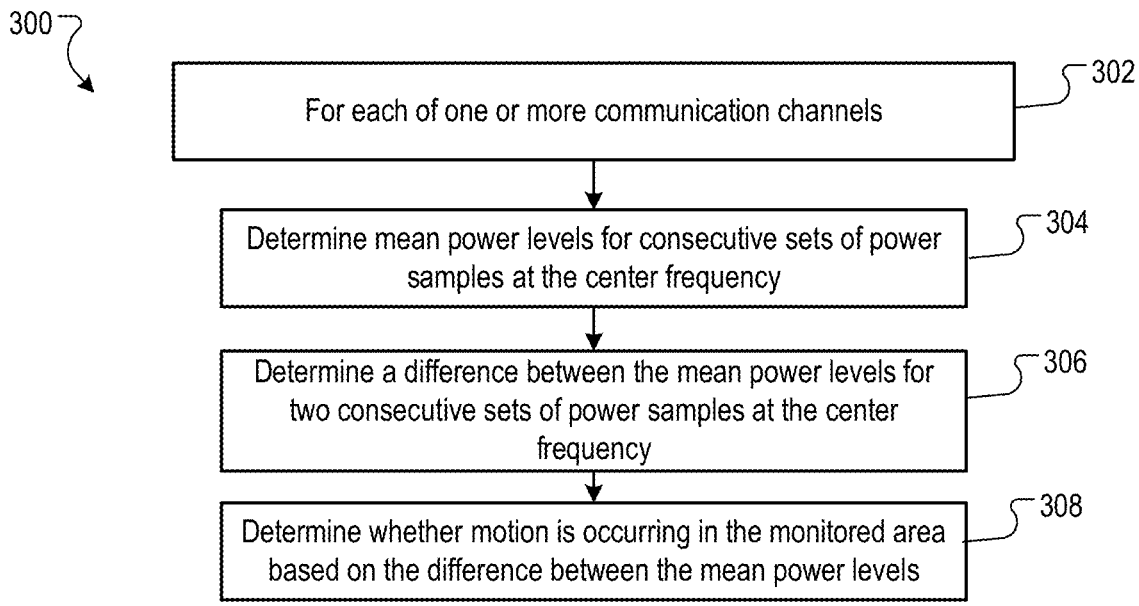
FIG. 3 is a flow diagram of an example process of detecting motion based on mean power levels of a carrier signal.
Figure 4:
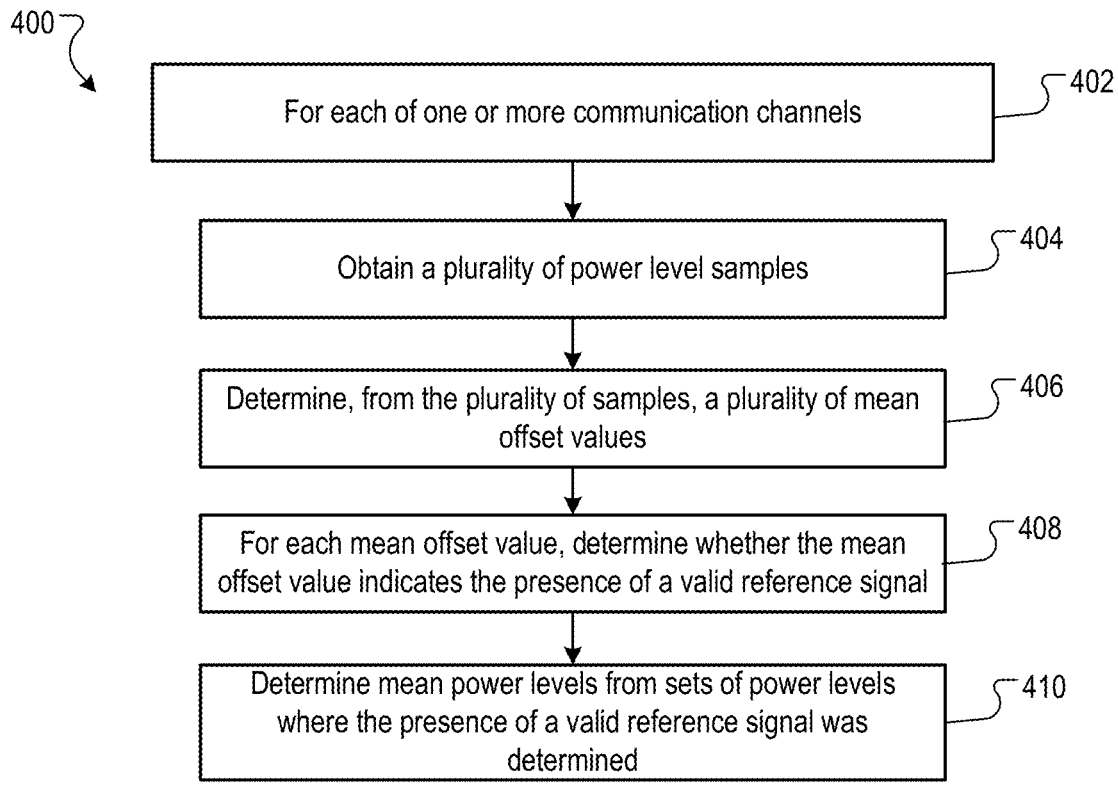
FIG. 4 is a flow diagram of an example process of determining whether a valid reference signal exists for determining mean power levels.

The processes described below can be performed in individual receiver devices that have been programmed to perform the process operations. In the event receiver performs the processes, each receiver performs the process for the particular channel (or channels) it is monitoring. FIGS. 3 and 4 describe processes that are done for each of one or more communication channels. Thus, when the processes 300 and 400 are done for multiple channels simultaneously, then the process may be done by a single receiver monitoring each channel, or, alternatively, by corresponding multiple receivers each processing a single channel.

The processes described below can alternatively be performed by a processing device remote from the receivers. In these situations, the remote processing device, e.g., processing device 150 of FIG. 1, receives the RSSI data from the receivers and performs the monitoring operations in parallel for each receiver.

FIG. 3 is a flow diagram of an example process 300 of detecting motion based on mean power levels of a carrier signal. The process is performed for each of one or more communication channels being monitored for motion detection (302).

For each channel, the process 300 determines mean power levels for consecutive power samples at the center frequency (304). For example, for every n samples of the power level of a carrier frequency of the channel, the mean power level (or some other central tendency) is determined. The mean power level may be a value binned to the center frequency, or may be a power level derived from a small band centered about the center frequency. In some implementations, n is equal to four, and the samples for a particular mean calculation do not overlap with samples for another mean calculation.

The process 300 determines a difference between the mean power levels for two consecutive sets of power samples (306). For example, the most recent mean power level may be subtracted from the most current mean power level.

The process 300 determines whether motion is occurring in the monitored area based on the difference between the mean power levels (308). For example, if the difference is greater than a threshold, e.g., 4 dBm, then the process determines motion has been detected.

Error Reduction

While the process 300 can be used to detection motion, the process 300 may, in some situations, result in false positives and false negatives. Accordingly, there are several error reduction techniques that can be used to increase detection reliability.

A first error reduction technique is reference signal validation. As described previously, in some implementations, the reference signal is a low power, zero-bandwidth, unmodulated carrier signal. Because of these characteristics, the carrier signal is readily detectable even in the presence of noise and multiple overlaid modulated signals of varying bandwidths.

In some implementations, the system evaluates whether the reference signal is present and valid at a given center frequency by evaluating three factors. First, ensuring there is signal consistency—determining whether the signal more or less maintains a constant power level. Second, ensuring there is enough headroom to support motion detection. Signals at too low a level will drop out, triggering false events. And third, ensuring the signal envelope has does not exceed a threshold variation, i.e., ensuring the signal is not determined to be a noisy signal. Thus, in operation, the system averages three main signal parameters at a high rate continuously, updating them at a configured sample rate, and updates the reference signal status periodically, e.g., every second, for each of the channels. This ensures the detection of a high-quality signal and an up-to-the-moment decision as to which signal or signals should be dominant.

When multiple channels are monitored for a same area, the system can, in some implementations, rank the signal of each channel against the signals of other channels. Thus, when multiple reference signals are used to monitor a same area, the system may select the channel with the highest ranking (e.g., highest power level, or highest $M_{est}$ value, the latter of which is described below) for processing.

Because the carrier signal at the center frequency has a narrow frequency, at close distances, e.g., within a range that the signal does not below a floor threshold, e.g., −70 dbm, it is not unusual for minimum, maximum, and mean power values to be very close or identical values. The exception to this phenomenon is when motion is present. In contrast, modulated data signals are more likely to have a minimum and maximums that extend above and below the mean but vary in amplitude, with noise and other data spikes introducing still more lopsided distributed waveforms.

To determine whether a channel has a reference signal with enough power to overcome the other signals to provide adequate motion detection capability, the device calculates an estimated mean offset ($M_{est}$):

$$M_{est_k} = \frac{\sum_{j=1}^{c} \frac{\sum_{i=(j-1+kc)N}^{(j+kc)N-1} f(x_i)}{N} - \frac{\max(f(x_{(j-1+kc)N}), \ldots, f(x_{(j+kc)N-1})) + \min(f(x_{(j-1+kc)N}), \ldots, f(x_{(j+kc)N-1}))}{2}}{c}$$

where $f(x_i)$ is the RSSI sample at a sample count number referenced by a non-negative integral sample number i, $i \in \{0, 1, 2, \ldots\}$ that is sampled in sets of N in a total range of c samples.

The $M_{est}$ value is an approximation of how much noise and information is present in the received signal relative to the reference signal level. A value close to or above −1.00 indicates the signal is a high quality reference signal. At or below −1.50 indicates the signal has too much noise and cannot be used. This is because a signal below this range is less dependable as a motion reference. Between −1.0 and −1.50, the signal is reliably stable and trustworthy and can serve as a motion reference. Modulated signals in general score around −1.80 or lower while reference signals score around −1.00 or higher, even in the presence of external interference.

$M_{est}$ is calculated by keeping track of the sum of the maximum and minimum values for every N signal samples and using them to estimate a mean for that set, then taking the difference between that mean and the actual mean of the samples, then averaging them over the predetermined range of sample sets. For example, for a sample set size N=4, and a sample rate R of 16 Hz:

$$\frac{R}{N} = \frac{16 \frac{\text{samples}}{\text{sec}}}{4 \frac{\text{samples}}{\text{set}}} = 4 \frac{\text{sets}}{\text{sec}}$$

Other sample rates and numbers of sets can also be used.

In some implementations, a range time is selected as a minimum time for collecting sets of means to determine $M_{est}$. In one example implementation, the range time is 8 seconds. Thus, when the total range c of sets is 32, with four sets per second: and the range value c is 32 sets, so at four sets per second:

$$\frac{c}{R/N} = \frac{Nc}{R} = \frac{N \frac{\text{samples}}{\text{set}} \cdot c \frac{\text{sets}}{\text{range}}}{R \frac{\text{samples}}{\text{sec}}} = \frac{Nc}{R} \frac{\text{secs}}{\text{range}} = 8 \frac{\text{secs}}{\text{range}}$$

Therefore, for these example parameters, eight seconds after startup is sufficient to gather the necessary 32 sets of means and 32 averaged minimum and maximum values to determine $M_{est}$.

Once the total range of c sets is processed, a rolling computation for subsequent calculations of $M_{est}$ is done. In the rolling computation, the first computation begins with the data from the very first second of samples, and the next computation begins with the data from the second second of the data, and so on, so that each second there will always be an updated signal profile coming in. Recall the summation formula for $M_{est}$:

$$\frac{\sum_{j=1}^{c} \frac{\sum_{i=(j-1+kc)N}^{(j+kc)N-1} f(x_i)}{N} - \frac{\max(f(x_{(j-1+kc)N}), \ldots, f(x_{(j+kc)N-1})) + \min(f(x_{(j-1+kc)N}), \ldots, f(x_{(j+kc)N-1}))}{2}}{c}$$

Each successive set of c samples results in a new $M_{est_k}$ and thus k is incremented by one (corresponding to an increase in i of (c·N). This calculated value for each channel is then compared to a threshold value every cN/R, seconds and, if it is at or below the threshold, that channel is judged to hold a suitable reference signal. Otherwise, it is not a suitable reference signal. The results in reliably detecting and using a reference signal under very noisy conditions, as well as determining when the reference signal drops below salvageable noise and data levels based on the exact hardware and environment in operation.

However, when computing the result in a piecewise, rolling fashion, an estimated mean error sample is calculated once per second from the four sets that are sampled. Then these estimates are averaged for the total eight seconds to give the full result.

In some implementations, up to sixteen channels are supported simultaneously per receiver. The time between evaluations of signal quality can be adjusted using system parameters, and one second is provided as an example. This increase in the frequency of results by a factor of eight using rolling computation does not add significant computational overhead. Internally all the accumulation calculations are done stepwise as the data are received, and the final divisions are simple shifts. Thus, low power processors can be used to implement the $M_{est}$ calculation. Given the limited overhead required for these calculations, most small wireless devices in home automation systems already possess the necessary processing resources to be adapted to detect motion in additional to their primary operations of home automation.

Provided that the $M_{est}$ value meets or exceeds the threshold indicating a reliable signal, e.g., −1.5, the system will then use the data to determine whether motion is detected. For example, FIG. 4 is a flow diagram of a process 400 of determining whether a valid reference signal exists for determining mean power levels. The process 400 can be executed in receiver devices, or in a remote processing device.

The process 400 is performed for each of one or more communication channels being monitored for motion detection (402). The process 400 obtains a plurality of power level samples (404). For example, the receiver can determine RSSI values for the carrier frequency reference signal.

The process 400 determines, from the plurality of samples, a plurality of mean offset values (406). For example, the process 400 can determine an initial mean offset value $M_{est}$, followed by rolling mean offset values $M_{est_k}$, as described above.

The process 400, for each mean offset value, determines whether the mean offset value indicates the presence of a valid reference signal (408). For example, at each new value $M_{est_k}$, the process 400 determines whether the value meets or exceeds a threshold value, e.g., −1.5.

Provided the process 400 determines the mean offset value indicates the presence of a valid reference signal, then the process 400 determines mean power levels from sets of power levels where the presence of a valid reference signal was determined (410). One example process for determining the mean power levels is described with reference to FIG. 5 below.

Conversely, if the process 400 determines the mean offset value does not indicate the presence of a valid reference signal, then the process 400 does not determine mean power levels from sets of power levels for that sampling time and will re-evaluate the presence of a valid reference signal after the next sampling time.

Figure 5:
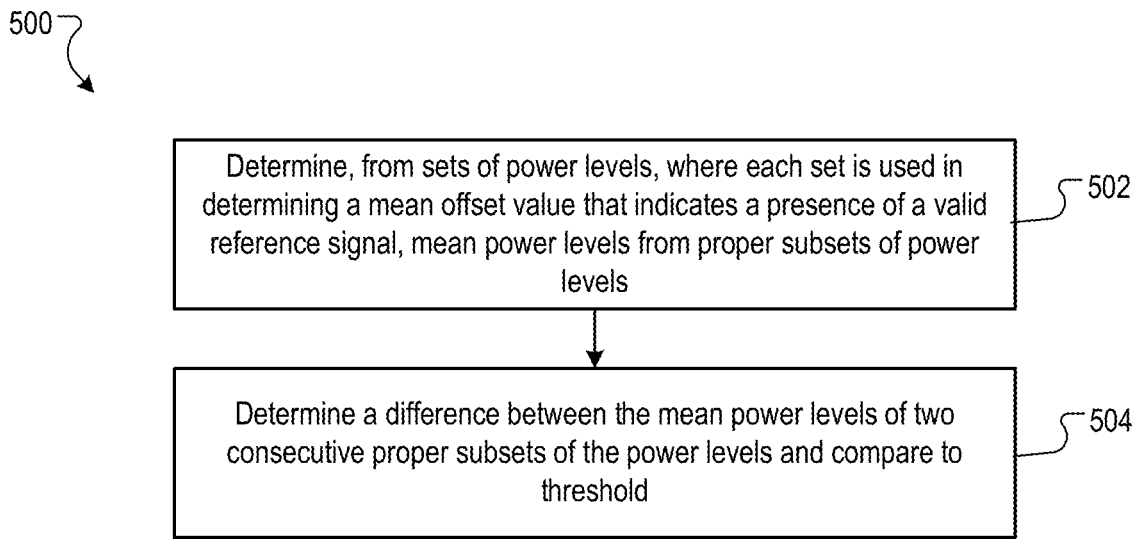
FIG. 5 is a flow diagram of an example process of detecting motion based on mean power levels of proper subsets of power levels.

FIG. 5 is a flow diagram of an example process 500 of detecting motion based on mean power levels of a proper subsets of power levels. The process 500 can be executed in receiver devices, or in a remote processing device.

The process 500 determines, from sets of power levels, where each set is used in determining a mean offset value that indicates a presence of a valid reference signal, mean power levels from proper subsets of power levels (502). For example, for a current $M_{est_k}$ value for which the reference signal is determined to be valid, 32 sets of power levels are collected to determine the mean estimate value. Of those 32 sets, a proper subset of the eight most recent power levels is used to determine $M_{est}$, the mean offset value for the sample set, which is then compared against a threshold, e.g., −1.50, to determine whether the signal is a valid reference signal.

The process 500 determines a difference between the mean power levels of two consecutive proper subsets of the power levels and compares the difference to a threshold (504). For example, if the difference is greater than a threshold, e.g., 4 dB, then the process 500 determines motion has been detected.

Another optional error reduction process for motion determination can include an absolute range check for maximum and minimum power level samples from two consecutive sets of power samples. For example, with N being an integer number describing the number of samples per set of data, e.g., 4, there must be at least two sets of N samples of data collected by the system at the sample rate R from a signal source that meets the criteria for a suitable reference signal as defined previously. The latter set is a just completed set and the former is an immediately prior completed set to the latter set. Each sample set of N items is analyzed and the maximum, minimum, and mean values of each are compared.

For this optional check, when the absolute value of the difference between the means ($mean_1$, $mean_2$) of the two sets is more than 4 dBm, and the sum of the absolute value of the difference between the maximum values ($max_1$, $max_2$) of the two sets and the absolute value of the difference between the minimum values ($min_1$, mine) of the two sets is more than 4 dBm, and the reference signal is valid for both sets ($valid_{1,2}$), the motion is determine to have occurred, i.e.:

$$\text{motion} = \{(abs(mean_1 - mean_2) > 4) \wedge [ (abs(max_1 - max_2) + abs(min_1 - min2)) > 4] \wedge valid_{1,2}\}$$

Figure 6:
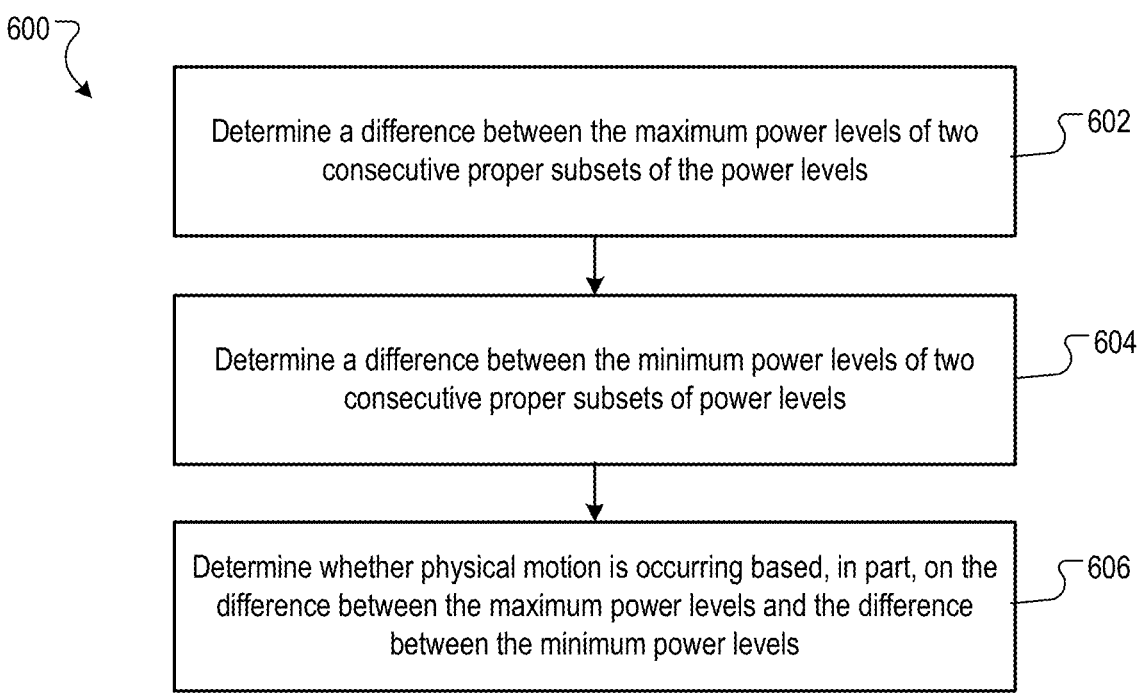
FIG. 6 is a flow diagram of an example process of detecting motion based, in part, on maximum power levels and minimum power levels.

FIG. 6 is a flow diagram of an example process 600 of detecting motion based, in part, on maximum power levels and minimum power levels. The process 600 can be executed in receiver devices, or in a remote processing device.

The process 600 determines a difference between the maximum power levels of two consecutive proper subsets of the power levels (602). For example, the process 600 determines $abs(max_1-max_2)$.

The process 600 determines a difference between the minimum power levels of two consecutive proper subsets of power levels (604). For example, the process 600 determines $abs(min_1-min_2)$.

The process 600 determines whether physical motion is occurring based, in part, on the difference between the maximum power levels and the difference between the minimum power levels (606). For example, the process 600, in addition to determining the difference between the mean power levels of two consecutive proper subsets of the power levels and comparing the difference to a threshold, the process also compares the difference between the maximum power levels of two consecutive proper subsets of the power levels to a respective threshold, and compares the difference between the minimum power levels of two consecutive proper subsets of power levels to a respective threshold.

Presence State Machine

Figure 7:
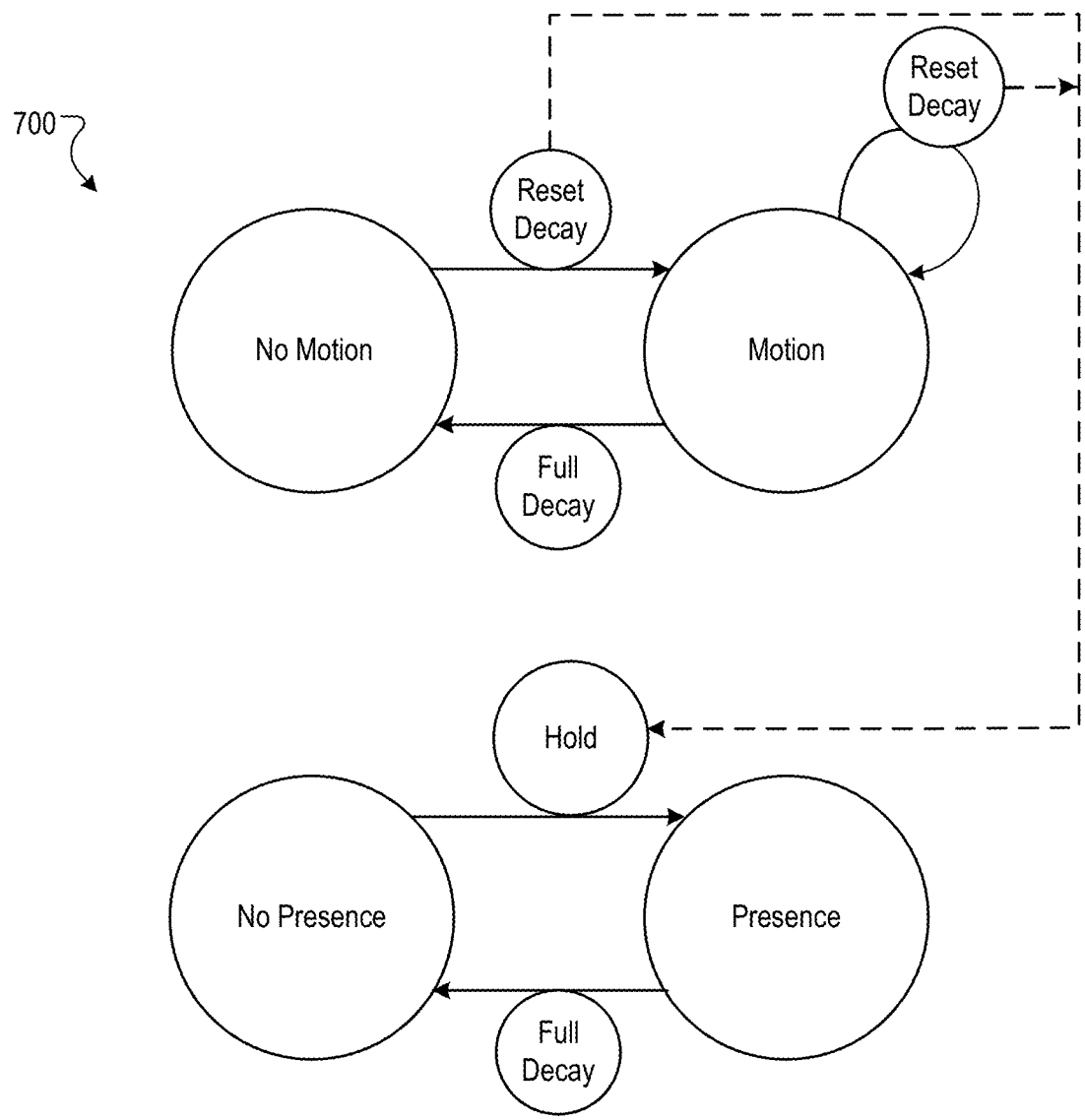
FIG. 7 is a state machine diagram that illustrates presence detection based on motion.

FIG. 7 is a state machine diagram 700 that illustrates presence detection based on motion. When motion is sensed, a motion state is advanced to a Motion state and a motion hysteresis is reset to default value for the Motion state. A state of Presence is inferred from motion and the Presence state is initially in a hold state.

Each time motion is sensed, the hysteresis decay is reset ("Reset Decay"), and the Presence state is maintained in the hold state. Only after a Motion state hysteresis expires ("Full Decay") does a hysteresis decay begin for the Presence state. At the expiration of the Presence hysteresis, the state machine transfers to the No Presence state. In some implementations, the presence hysteresis decay time is a longer period than the motion hysteresis decay time.

Accordingly, a motion detection immediately implies a presence. From there, both states begin hysteresis-dampened decays, with the Presence state only beginning to decay after all motion ceases and after the presence hysteresis has decayed.

The process of motion detection is dependent on reception of one or more healthy reference signals. In some implementations, fault tolerant systems include redundancy in the form of an additional reference signal, preferably at another non-adjacent frequency, e.g., at least 20 MHz apart from the other signal. Reference signals from adjacent carrier frequencies can also be used, but the likelihood they are overlapped by a common interfering signal is higher that when reference signals from non-adjacent carrier signals are used.

Regions of motion detection can be defined by locating the reference signal sources within an area and grouping the related channels in the system. If more than one channel participates in a particular area's motion detection (referred to as a group), the system can apply a logical hierarchy to the triggers coming from those channels to create a super-state for the group. For example, the group channel is set to the channel with the highest motion state currently active in the group and the highest motion hysteresis count for that state currently set in the group. If all the above are satisfied, the group channel is set to the channel with the highest presence state currently active in the group and the highest presence hysteresis count (includes the "hold" value) for that state currently set in the group. If all the above are met by more than one channel in the group, the group channel is set to whichever channel has all the above and has the best signal reference power level.

Individual Object Monitoring

Figure 8:
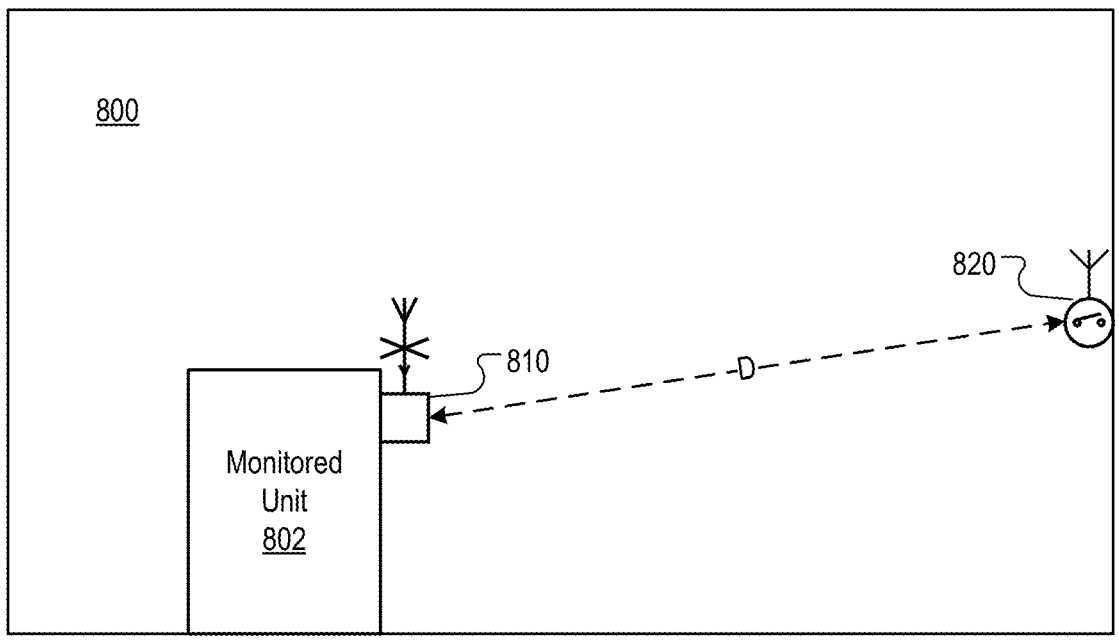
FIG. 8 is a diagram showing how a signal generator and receiver can be used to monitor motion of a monitored unit in a room.

The systems and methods described in this written description can also be used to detect motion of objects, which are referred to as monitored units. For example, a signal generator can be attached to a monitored unit, as shown in FIG. 8. In particular, FIG. 8 is a diagram showing how a signal generator 810 and receiver 820 can be used to monitor motion of a monitored unit 802 in a room 800. If the object 802 moves, the disturbance in the distance D between the signal generator and the receiver 820 can be detected as motion, using the same processes as described above.

Figure 9:
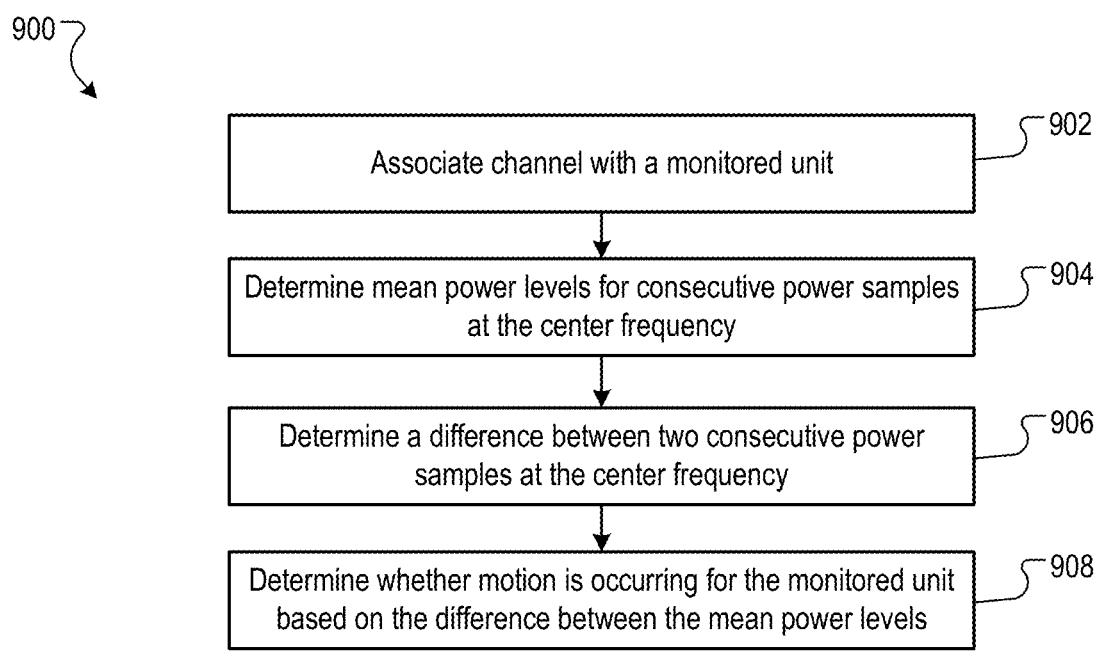
FIG. 9 is a flow diagram of an example process of detecting motion of the monitored unit of FIG. 7.

FIG. 9 is a flow diagram of an example process 900 of detecting motion of the monitored unit of FIG. 9. The process 500 can be executed in receiver devices, or in a remote processing device.

The process 900 associates a channel with a monitored unit (902). For example, if the signal generator generates a signal at a center frequency for channel 5, then then the monitored unit is associated with channel 5.

The process 900 determines mean power levels for consecutive samples at the center frequency (904). For example, for every n samples of the power level of a carrier frequency of the channel, the mean power level (or some other central tendency) is determined. In some implementations, n is equal to four, and the samples for a particular mean calculation do not overlap with samples for another mean calculation.

The process 900 determines a difference between the mean power levels for two consecutive sets of samples (906). For example, the most recent mean power level may be subtracted from the most current mean power level.

The process 900 determines whether motion is occurring for the monitored unit based on the difference between the mean power levels (908). For example, if the difference is greater than a threshold, e.g., 4 dB, then the process determines motion has been detected.

Additional Implementation Details

In some implementations, motion sensing reference signal generator and receiver pairs can be configured with the reference signal generator at very low power settings and placed in specific locations. The data from these pairs can be processed by a remote device to detect motion when a narrow region is crossed between the two sensors. For example, the system can be configured to count the approximate number of people entering or exiting a room by detecting motion in an immediate doorway vicinity by placing a low power signal generator at a channel frequency one side of a doorway and a receiver that monitors the channel frequency on an opposite side of the doorway. Because of the low power signal, the detection is triggered only when person walks through the doorway. This same capability can secure doors and windows against entry, allowing alarm triggers with low-powered signals.

Note that signal generators at higher power settings, e.g., the generator 102 of FIG. 1, requires the generator be placed further indoors to prevent false alarms triggered by nearby sidewalk-walkers, e.g., person 101. At very low power, the pair only covers the immediate doorway in a region bisected by a straight line, similar to a beam of light and a light detector. This is depicted by the generator 143 and receiver 145 in FIG. 1. As used in this specification, a signal generator generates a "low power signal" when the power level is such that detection is limited to an area that is localized between the signal generator and receiver, such as the area 147 in FIG. 1. Signals that are not "low power" signals allow for detection in areas that are substantially limited only by impedance structures, such as a room 110, where detection of the signal of the signal generator 102 by the receivers 106 and 108 is limited by the structures such as the walls. For example, the signal by the signal 102 can be detected by receivers 106 and 108 by one or more multipath reflections, while the signal from the generator 143 can only be detected direct path to the receiver 145, and cannot be detected by the receiver though a multipath reflection.

Additionally, placing a receiver device inside a moving device, such as a door, for example, while placing the signal generator at a stationary location (or vice versa) allows for the relative motion property to be purposed to detect the movement of a device. In some implementations, signal strength awareness can be used to estimate how much the device has been displaced, e.g., how far open the door is by determining the relative signal strength of the lower power signal received when the door is closed to when the door is open. A calibration procedure is used to determine received signal strengths when the door is open and when the door is closed. Similar logic could be applied to overhead doors, sliding doors, and dumb waiters.

In another implementation, lighting control can be done by the detection processes described herein. For example, lights that are outfitted with receivers, and/or switches that are outfitted with receivers, can monitor the reference signals as described above, and take actions in response to motion and presence detection. Moreover, because the determinations may be made within the receivers themselves, reaction time is nearly instantaneous and need not require connection to a larger control network.

In variations of this implementation, a lower power monitoring scheme as describe above may be used to control local lighting of a small area, e.g., the area around a lamp, such as a reading lamp by a chair. Thus, when a person walks in another part of the room, the lamp is not activated, thereby conserving power.

This localized detection scheme can be expanded to allow for separate coverage areas of a larger room. Accordingly, areas with no occupancy are left dark. Occupancy data may be reported to a security program and superimposed on a floor map. Additionally, significant energy savings are possible by controlling larger appliances via the information provided by the devices.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   for each of one or more communication channels, wherein each communication channel has a center frequency that is different from the center frequency of each other communication channel:
      determining mean power levels from consecutive power samples at the center frequency;
      determining a difference between the mean power levels of two consecutive power samples at the center frequency; and
      determining whether physical motion is occurring in a monitored area based on the difference between the mean power levels.

2. The computer-implemented method of claim 1, further comprising, for each of the one or more communication channels:
   periodically sampling a power level based on the center frequency at a sampling rate to obtain a plurality of samples;
   determining, from the plurality of samples, a plurality of mean offset values, wherein each mean offset value is an estimate of a received signal power at the center frequency relative to a reference signal level at the center frequency; and
   for each mean offset value, determining whether the mean offset value indicates a presence of a valid reference signal;
   wherein:
   determining mean power levels from consecutive power samples at the center frequency comprises determining, from sets of power levels, where each set is used in determining a mean offset value that has been determined to indicate a presence of a valid reference signal, mean power levels from proper subsets of power levels; and
   determining a difference between the mean power levels of two consecutive power samples at the center frequency comprises determining a difference between the mean power levels of two consecutive proper subsets of the power levels.

3. The computer-implemented method of claim 2, wherein determining whether physical motion is occurring in the monitored area based on the difference between the mean power levels comprises determining whether motion is occurring in the area when an absolute value of a difference between the two consecutive sets is greater than a threshold value.

4. The computer-implemented method of claim 2, further comprising:
   determining a difference between the maximum power levels of two consecutive proper subsets of the power levels;
   determining a difference between the minimum power levels of two consecutive proper subsets of power levels; and
   wherein determining whether physical motion is occurring in the monitored area based on the difference between the mean power levels further comprises determining whether physical motion is occurring based on the difference between the maximum power levels and the difference between the minimum power levels.

5. The computer-implemented method of claim 4, wherein determining whether physical motion is occurring based on the difference between the maximum power levels and the difference between the minimum power levels comprises determining that physical motion is occurring in the area when a sum of the absolute value of the difference between the maximum values of the two sets and the absolute value of the difference between the minimum values of the two sets is greater than a first threshold value.

6. The computer-implemented method of claim 5, wherein determining whether physical motion is occurring in the monitored area based on the difference between the mean power levels comprises determining whether motion is occurring in the area when an absolute value of a difference between the two consecutive sets is greater than a second threshold value.

7. The computer-implemented method of claim 2, wherein periodically sampling the power based on the center frequency comprises periodically sampling a power level of signals within a specific bandwidth range of the center frequency.

8. The computer-implemented method of claim 2, wherein the one or more communication channels comprise a plurality of communication channels, and the method further comprises:
   associating each communication channel of the plurality of communication channels with a monitored area, wherein each monitored area for a communication channel is different from each monitored area associated with each other communication channel.

9. The computer-implemented method of claim 8, further comprising, in each monitored area:
   generating, within each monitored area, a reference signal at the center frequency of the communication channel associated with the monitored area.

10. The computer-implemented method of claim 9, further comprising, in each monitored area:
   monitoring, by a receiver within the monitored area, a reference signal at the center frequency of the communication channel associated with the monitored area for periodically sampling the power level based on the center frequency at the sampling rate.

11. The computer-implemented method of claim 9, wherein center frequencies are 802.11 channel frequencies.

12. A system, comprising:
a motion detection processor including a data processing apparatus and a non-transitory computer memory storing instructions executable by the data processing apparatus and that upon such execution cause the data processing apparatus to perform operations comprising:
for each of one or more communication channels, wherein each communication channel has a center frequency that is different from the center frequency of each other communication channel:
determining mean power levels from consecutive power samples at the center frequency;
determining a difference between the mean power levels of two consecutive power samples at the center frequency; and
determining whether physical motion is occurring in a monitored area based on the difference between the mean power levels.

13. The system of claim 12, the operations further comprising, for each of the one or more communication channels:
periodically sampling a power level based on the center frequency at a sampling rate to obtain a plurality of samples;
determining, from the plurality of samples, a plurality of mean offset values, wherein each mean offset value is an estimate of a received signal power at the center frequency relative to a reference signal level at the center frequency; and
for each mean offset value, determining whether the mean offset value indicates a presence of a valid reference signal;
wherein:
determining mean power levels from consecutive power samples at the center frequency comprises determining, from sets of power levels, where each set is used in determining a mean offset value that has been determined to indicate a presence of a valid reference signal, mean power levels from proper subsets of power levels; and
determining a difference between the mean power levels of two consecutive power samples at the center frequency comprises determining a difference between the mean power levels of two consecutive proper subsets of the power levels.

14. The system of claim 13, wherein determining whether physical motion is occurring in the monitored area based on the difference between the mean power levels comprises determining whether motion is occurring in the area when an absolute value of a difference between the two consecutive sets is greater than a threshold value.

15. The system of claim 13, further comprising:
determining a difference between the maximum power levels of two consecutive proper subsets of the power levels;
determining a difference between the minimum power levels of two consecutive proper subsets of power levels; and
wherein determining whether physical motion is occurring in the monitored area based on the difference between the mean power levels further comprises determining whether physical motion is occurring based on the difference between the maximum power levels and the difference between the minimum power levels.

16. The system of claim 15, wherein determining whether physical motion is occurring based on the difference between the maximum power levels and the difference between the minimum power levels comprises determining that physical motion is occurring in the area when a sum of the absolute value of the difference between the maximum values of the two sets and the absolute value of the difference between the minimum values of the two sets is greater than a first threshold value.

17. The system of claim 13, wherein periodically sampling the power based on the center frequency comprises periodically sampling a power level of signals within a specific bandwidth range of the center frequency.

18. The system of claim 13, wherein the one or more communication channels comprise a plurality of communication channels, and the operations further comprise:
associating each communication channel of the plurality of communication channels with a monitored area, wherein each monitored area for a communication channel is different from each monitored area associated with each other communication channel.

19. The system of claim 18, further comprising:
a plurality of reference signal generators, each of which is configured to be placed within an associated monitored area, and further configured to generate a reference signal at the center frequency of the communication channel associated with the monitored area.

20. The system of claim 19, further comprising:
a plurality of receivers, each receiver corresponding to a respective one of the corresponding reference signal generators and configured to be placed within an associated monitoring area, and further configured to monitor the reference signal at the center frequency of the communication channel associated with the monitored area for periodically sampling the power level based on the center frequency at the sampling rate.

21. The system of claim 13, wherein center frequencies are 802.11 channel frequencies.

22. A non-transitory computer memory storing instructions executable by a data processing apparatus and that upon such execution cause the data processing apparatus to perform operations comprising:
for each of one or more communication channels, wherein each communication channel has a center frequency that is different from the center frequency of each other communication channel:
periodically sampling a power level based on the center frequency at a sampling rate to obtain a plurality of samples;
determining, from the plurality of samples, a plurality of mean offset values, wherein each mean offset value is an estimate of a received signal power at the center frequency relative to a reference signal level at the center frequency;
for each mean offset value, determining whether the mean offset value indicates a presence of a valid reference signal;
determining, from sets of power levels, where each set is used in determining a mean offset value that has been determined to indicate a presence of a valid reference signal, mean power levels from proper subsets of the sets of power levels;

determining a difference between the mean power levels of two consecutive proper subsets of the power levels; and determining whether physical motion is occurring in a monitored area based on the difference between the mean power levels.

\* \* \* \* \*